E. B. CANTRELL & G. E. MILLER.
POWER TRANSMITTING MECHANISM.
APPLICATION FILED SEPT. 19, 1912.
1,090,383.  Patented Mar. 17, 1914.
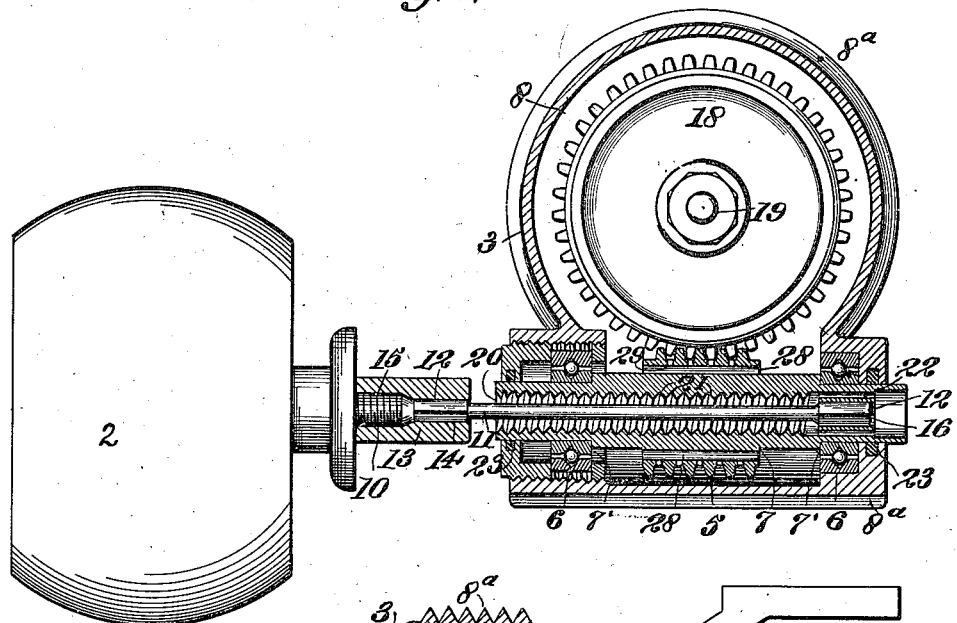
WITNESSES:
Charles Pickles
F. E. Maynard
INVENTORS.
Edwin B. Cantrell
George E. Miller,
BY G. H. Strong.
ATTORNEY

UNITED STATES PATENT OFFICE.

EDWIN B. CANTRELL, OF OAKLAND, AND GEORGE E. MILLER, OF SAN FRANCISCO, CALIFORNIA.

POWER-TRANSMITTING MECHANISM.

1,090,383. Specification of Letters Patent. Patented Mar. 17, 1914.

Application filed September 19, 1912. Serial No. 721,146.

*To all whom it may concern:*

Be it known that we, EDWIN B. CANTRELL, of Oakland, county of Alameda, State of California, and GEORGE E. MILLER, of the city and county of San Francisco, State of California, both citizens of the United States, have invented new and useful Improvements in Power-Transmitting Mechanism, of which the following is a specification.

The present invention relates to power transmitting mechanism, and particularly to a worm and gear mechanism in combination with a motor, and a cutter to be driven at a speed much reduced from that of the speed of the motor.

The object of the present invention is to so design and construct a transmitting mechanism for coupling a power unit, as a motor, with a cutting element, as a milling cutter, so that the necessary reduction of speed between the two elements may be had, and eliminate to the greatest possible extent friction generated by the members in operation; and to provide a mechanism of this type having for its purpose the reduction or elimination of the heat produced by the operation of the parts.

It is a further object of the invention to provide a power transmitting mechanism or coupler between a high speed motor and a relatively slow speed cutter, involving a transmitting member loosely connectible with the motor and with the worm gearing, and operating as a safety factor and coupler efficiently effective to couple the elements irrespective of the axial alinement of the motor and the worm, or its equivalent element, in the transmission mechanism.

The invention consists of the parts and the construction and compination of parts as hereinafter more fully described and claimed, having reference to the accompanying drawings, in which—

Figure 1 is a view showing the motor and the transmission mechanism, the latter being in section. Fig. 2 is a transverse sectional view through the transmission mechanism.

In its illustrated embodiment, our invention comprises an electric motor 2 and transmitting mechanism, designated generally at 3, the function of which is to drive a milling cutter or other tool 4 at a speed considerably less than the speed of the motor.

Ordinarily, in connecting a motor through a transmitting mechanism to a cutter or other element to be driven at a slow speed, the motor may be arranged with its shaft in axial alinement with an element of the transmission mechanism, and unless the axial alinement of the motor and this element be true, then there is encountered and generated undue and unnecessary friction which tends to defeat the efficient operation of the mechanism, in addition to causing unnecessary wear and heating of the parts; the heating of the parts rendering neutral or valueless the lubricant which may be applied.

Our invention contemplates the employment of a transmitting mechanism, as 3, which is here shown as involving a worm 5, which is supported in suitable antifriction bearings 6—6, adjusted against shoulders 7'—7' formed on the body or spindle 7 upon which the worm is cut or attached; the bearings 6 being mounted in contiguous portions of an oil-tight casing 8. The worm 5 in the present instance is arranged with relation to the shaft 10 of the motor, so that their axes are approximately in alinement; the worm being driven directly by the shaft 10 of the motor and with its speed.

Our present invention is evolved with the object of providing such a connection between the motor shaft 10 and the worm 5, that the latter can be driven by the former even though the axial alinement of the two is untrue or destroyed. We obtain this connection between the shaft 10 and the worm 5 through means of a rod, shaft or connection 11, having formed upon it polygonal ends or heads 12. One of the heads 12 rests in a nipple or union 13, provided with a polygonal, axial chamber 14 conforming to the head 12, and in which the latter may be fitted to be rotatably driven, though it may have a slight longitudinal and transverse play without destroying its transmitting power. The nipple or union 13 is shown as screwed at 15 on to the shaft 10.

The body portion of the coupling connection 11 is preferably formed of a diameter of such area that it will break or yield under the torsion of the motor, in the event that the worm 5 is subjected to such a resistance as would stop the operation of the motor. The opposite polygonal end 12 of the coupler 11 is seated in a polygonal chamber 16 of a transverse area approximating that of the head 12; the chamber 16 being formed in the adjacent end of the worm body 7.

When the motor is energized and rotating, its power is transmitted through the union 13 and the coupler or safety shaft 11 to the worm, through the engagement of the polygonal head 12 with the walls of the chamber 16 of the worm body 7, thus turning the worm which is shown as meshing with a worm wheel 18, mounted upon a shaft 19 which projects through the casing 8 in which the worm and worm wheel revolve. The shaft 19 when being driven carries and operates the cutter 4, hereinbefore referred to, the speed of which is reduced through the transmission mechanism, so as to enable the cutter or other tool adjusted upon the shaft to perform its duty.

By means of the flexible and relatively free coupler or safety shaft 11 we have produced a connection between a motor, as 2, and the driven member, as the worm 5, whereby the latter may be driven, even though, due to vibration of the machine or to stresses encountered in operation, or for the reason of improper alinement of the axes of the shaft and the worm, the latter will be driven by the motor without such undue friction as would be encountered if the motor shaft were coupled to the worm by a rigid, inflexible, relatively immovable member. Having provided for a proper operation of the worm 5 by the motor 2 by means of the flexible and movable coupler or shaft 11, it is a further object of our invention to provide means for keeping down the temperature of the transmission mechanism, as 3, to the greatest possible extent to prevent wear on the parts because of heating. This is accomplished by forming in the body 7 of the worm 5 a chamber or opening 20, extending from end to end therethrough, in which air may freely circulate, entering at one end of the shaft or body 7 and passing out of the other end; the shaft projecting through or extending to the sides of the casing 8 thus being exposed to the atmosphere.

For the purpose of accelerating the flow of air through the worm shaft or body 7 and thus further preventing heating of the same, we form on the interior of the chamber threads or spiral projections 21 which have the function, during the rotation of the shaft 7, of forcing the air to flow through the chamber within the shaft. In order to provide means for the passage of air passing the bearing of the coupler head 12, we provide a plurality of drill holes or apertures 22, communicating with the chamber within the shaft 7 and with the atmosphere on the opposite end. Thus, by providing the chamber 20 within the worm or worm shaft, air may circulate freely therethrough, and the circulation is induced or increased by means of the spiral projections or threads 21 which act upon the air to force it along.

The casing 8 of the mechanism is preferably formed liquid-tight, so as to contain a volume of oil or other lubricating medium so that this can circulate freely between the several antifriction bearings and the gears 5 and 18. The casing 8 is provided at the necessary places with packing rings 23; these being shown in Fig. 1 at the ends of the lower portion and at the side in Fig. 2, so as to embrace the shaft 19 where it passes through the wall of the casing.

It is important in reducing the speed from a high velocity to a low velocity to provide not only means for eliminating heat and means for amply lubricating the movable elements, but it is also desirable to provide a type of bearings for the movable elements where they are supported in the casing as will eliminate to the greatest possible extent friction of rotation. This is accomplished by the introduction of the ball-bearings 6—6 which take the radial thrust of the worm and also the end thrust throw, and the shaft 19 is supported within its casing by a ball-bearing 24 or its equivalent, as shown in Fig. 2; the wheel 18 being steadied against lateral movement by an adjustable antifriction bearing 25 upon the outside of the casing 8, controlled by a nut 26 threaded on the shaft 19.

In addition to the air-circulating means which we provide for the reduction of temperature, the casing 8 is also formed with radiating surfaces 8$^a$ which serve to radiate such heat as may be imparted to the oil during the operation of the mechanism.

A circulation of oil through the casing 8 may be increased appreciably by forming longitudinal apertures or ducts 28 in the body of the worm 5, through which oil may circulate from end to end. The circulation of the oil is mechanically forced by the operation of centrifugal force, throwing the oil from the ducts 28 radially outward through small ports or openings 29. These ports 29 are formed at the bottoms of the roots of the threads on the worm 5. The increased circulation of the oil, because of the centrifugal force generated by the rotation of the worm 5, brings the oil into closer proximity to the air-cooled chamber 20 in the worm body, and also causing the oil during its movement through the casing to move against the radiating surfaces of the case 8, thereby carrying off some of the heat units generated. By this means of coupling the motor to the worm, the motor can be set close up to the worm end and the slender coupler utilized to connect both without rigid connection.

Having thus described our invention, what we claim and desire to secure by Letters Patent is—

1. In power transmitting mechanism, a worm having a body portion, a casing in which the worm is mounted, antifriction bearings interposed between the body of the worm and the casing to reduce running friction and supporting the worm, a worm-gear meshing with and driven by said worm, antifriction bearings supporting the worm gear in the casing, the worm having a passage extending through the same, and communicating at its ends with the atmosphere so that air may circulate therethrough.

2. In a power transmitting mechanism, the combination with a driven member, of suitable bearings for said member, and a driving member for the driven member, said driving member being internally chambered from end to end for communication with the atmosphere, so that air may circulate through the driving member to convey away heat due to the friction of the operating parts.

3. In a power transmitting mechanism, the combination with a driven member, of suitable bearings for said member, a driving member for the driven member, said driving member being internally chambered from end to end for communication with the atmosphere, so that air may circulate through the driving member to convey away heat due to the friction of the operating parts, said driving member having means for maintaining the circulation of air through said chamber.

4. In a power transmitting mechanism, the combination of a shaft, antifriction bearings supporting the shaft, a driven gear secured on the shaft, and a driving gear meshing with the gear on said shaft, said driving gear being provided with means for preventing an undue increase of temperature therein.

5. In a power transmitting mechanism, the combination of a shaft, antifriction bearings supporting the shaft, a driven gear secured on the shaft and a driving gear meshing with the driven gear, said driving gear being provided with means for preventing an undue increase of temperature therein, said means comprising projections formed on the interior of the driving gear whereby air can be circulated through the interior of the same.

6. The combination in power transmitting mechanism, with a shaft carrying a member adapted to be driven, of a gear fastened on the shaft, and a driving worm meshing with said gear, said driving worm being internally chambered from end to end for the passage of air therethrough, and having threads formed on the wall of the chamber.

7. The combination in power transmitting mechanism, with a shaft carrying a member adapted to be driven, of a gear fastened on the shaft and a driving worm meshing with said gear, said driving worm being internally chambered from end to end for the passage of air therethrough, and having threads formed on the wall of the chamber, an oil-tight casing in which the driving worm and the driven gear are operable and immersed in oil, said casing having packing rings for the prevention of the escape of oil, and said worm having means for reducing the temperature of the oil, said means comprising ducts formed through the driving worm, said ducts being cooled by the radiation of heat through the interior chamber of the gear.

8. In combination with a driving motor, a shaft carrying a member to be driven at a speed less than that of the motor, a gear fast on said shaft, a worm meshing with said gear, said worm having an interior axial chamber with a longitudinal, polygonal pocket, a coupler attachable to the motor shaft having a polygonal socket, and a relatively flexible connecting-rod or shaft having polygonal ends insertible in the polygonal pocket of the worm chamber and in the coupler socket, whereby power may be transmitted from the motor to the worm to drive the shaft.

9. In power transmitting mechanism, the combination with a motor and a gear set, comprising a gear adapted to be arranged with its axis in approximate alinement with the motor shaft, and a rod for transmitting power from the motor to the gear, said rod having polygonal ends for positive rotary engagement with a contiguous portion of the motor at one end and a contiguous portion of the gear at the other end.

10. In power transmitting mechanism, a driving element and an element to be driven thereby, having their axes of rotation in approximate alinement, and a coupler with a breaking strength less than said elements and being axially connected thereto for positive rotary and free longitudinal movement, whereby said parts are driven irrespective of the disalinement of their axes.

11. In a power transmitting mechanism, the combination of a driven shaft, antifriction bearings for taking radial and end thrust of the shaft and for holding it against vibration during operation, a gear fast on the shaft, a driving gear meshing therewith, said driving gear being provided with means for reducing friction and avoiding heating when running at high speed, a driving motor, and a yieldable torsion connection between the motor and the driving gear.

12. In a power transmitting mechanism, the combination of a driven shaft, antifriction ball-bearings for taking radial and end thrust of the shaft and for holding it against vibration during operation, a gear fast on said shaft, a driving gear meshing therewith, said driving gear having means for reducing friction and avoiding heating when running at high speed, a driving motor, and a connection between said motor and the driving gear.

In testimony whereof we have hereunto set our hands in the presence of two subscribing witnesses.

EDWIN B. CANTRELL.
   GEORGE E. MILLER.

Witnesses:
 JOHN H. HERRING,
 W. W. HEALEY.